United States Patent [19]

Chiarion

[11] Patent Number: 4,866,364
[45] Date of Patent: Sep. 12, 1989

[54] POWER CIRCUIT FOR SWITCHING THE NUMBER OF POLES ON THE ROTOR OF SYNCHRONOUS MACHINES BY USING ROTATIVE DIODES

[75] Inventor: Giovanni Chiarion, Milan, Italy

[73] Assignee: Tecnomasio Italiano Brown Boveri S.p.A., Milan, Italy

[21] Appl. No.: 163,761

[22] PCT Filed: Jun. 22, 1987

[86] PCT No.: PCT/EP87/00324

§ 371 Date: Apr. 27, 1988

§ 102(e) Date: Apr. 27, 1988

[87] PCT Pub. No.: WO88/00409

PCT Pub. Date: Jan. 14, 1988

[30] Foreign Application Priority Data

Jun. 27, 1986 [IT] Italy .................. 20933 A/86

[51] Int. Cl.⁴ .................................. H02P 19/12
[52] U.S. Cl. ........................ 318/704; 318/732; 318/734
[58] Field of Search ............ 318/704, 732–736, 318/773–777, 818–828

[56] References Cited

U.S. PATENT DOCUMENTS 1,770,871  7/1930  Alger .................... 318/704
3,082,364  3/1963  Fischer et al. ............ 318/828
4,477,760  10/1984  Kuznetsov .

FOREIGN PATENT DOCUMENTS 243512  6/1960  Australia .................. 318/704
493149  8/1970  Switzerland .

OTHER PUBLICATIONS

Vogele, Hans; "Technik der Polumschaltung für Pumpspechermaschinen grosser Leistung", Brown Boveri Mitteilungen, vol. 61, No. 7 (Jul. 1974), pp. 327–331.

Primary Examiner—David Smith, Jr.
Attorney, Agent, or Firm—Peter K. Kontler

[57] ABSTRACT

A circuit for changing the poles of a rotor of a synchronous machine having contact brushes in operative connection with first and second slip rings includes a switch for reversibly connecting the contact brushes to an electrical current source, reversible pole coils operatively connected to one of the slip rings and connected through a first diode to a circuit portion which is formed by irreversible pole coils, and by a second diode and a third diode, and which is operatively connected with the other of the slip rings, and a circuit branch including a fourth diode having a polarity reversed with respect to the polarities of the first, second and third diodes. One terminal of the fourth diode is connected between the reversible pole coils and the first diode and the other terminal of the fourth diode is connected between the irreversible pole coils and the second diode.

6 Claims, 2 Drawing Sheets

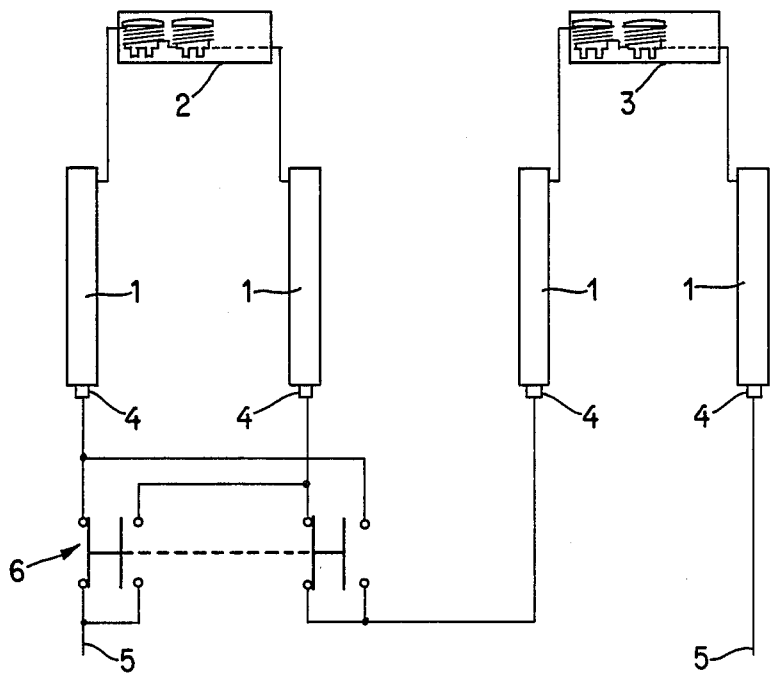
PRIOR ART  FIG. 1
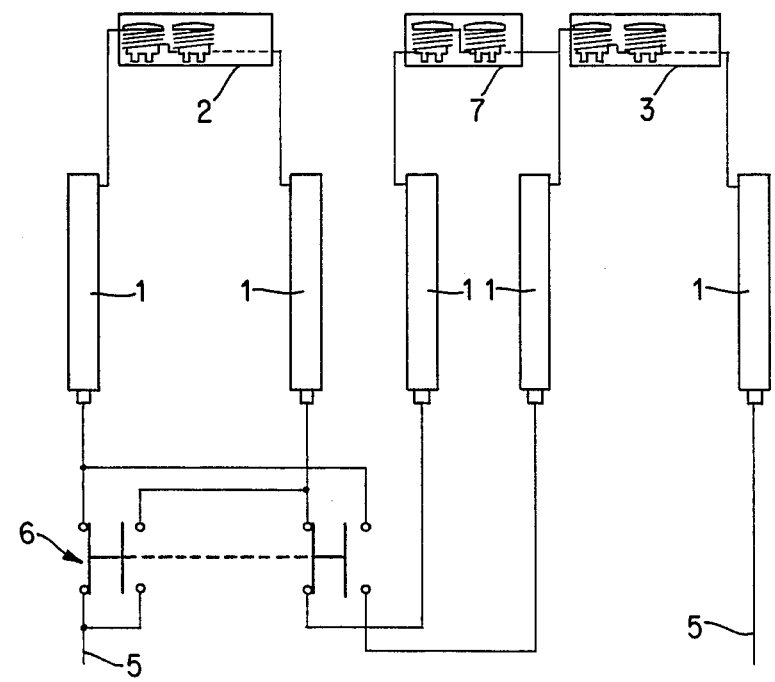
PRIOR ART  FIG. 2

POWER CIRCUIT FOR SWITCHING THE NUMBER OF POLES ON THE ROTOR OF SYNCHRONOUS MACHINES BY USING ROTATIVE DIODES

The present invention relates to a circuit for changing poles of a rotor of a synchronous machine.

In many branches of industry in which electrical synchronous machines are utilized, it is necessary to change the poles of the rotors. This is particularly important in power plants. When certain hydraulic circumstances exist, e.g. during strong variations of the head or when utilizing the installation as a turbine and as a pump, it is in practice necessary for a turbine-generator assembly to be able to be driven at two different speeds. Alteration of the speed can be effected in an advantageous manner by altering the electrical pole number of the rotor.

As is known, changeover of the poles of the rotor of a synchronous machine is effected by reversing the direction of flow of the excitation current in the windings or coils of certain pole groups, while disconnecting other pole groups.

In the accompanying drawings:

FIGS. 1 and 2 show electrical circuits with and without poles to be disconnected, as are known from the state of the art;

Figure 3:
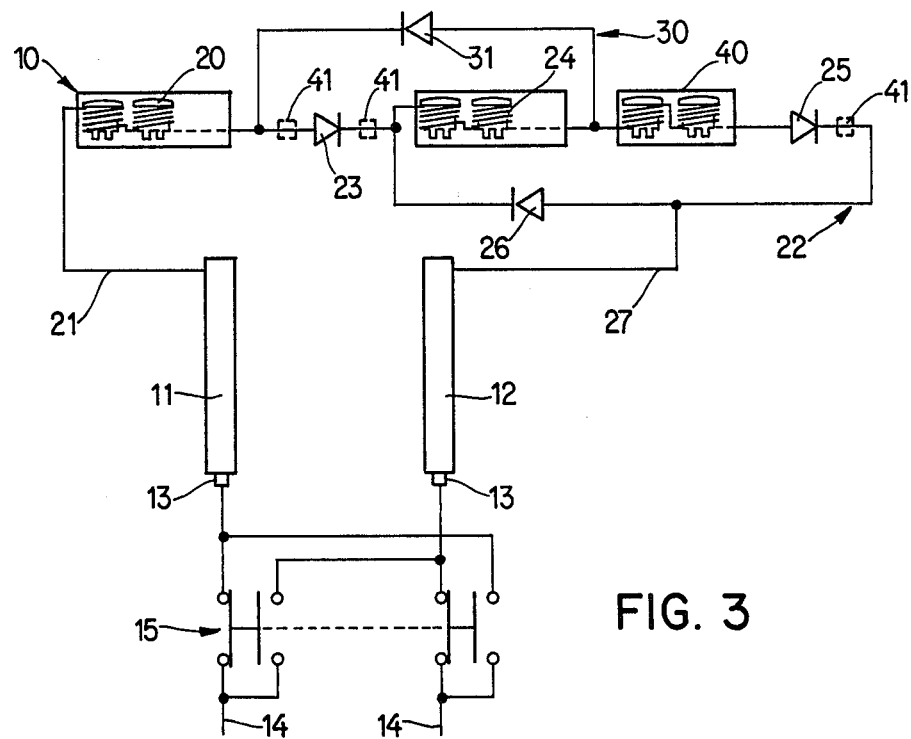
FIG. 3 shows an electrical changeover circuit embodying the present invention.

In order to change over only a single pole, it is necessary to employ four slip rings, as is illustrated by the circuits of FIG. 1.

The slip rings, which are indicated by reference numerals 1, are connected to reversible pole coils 2, and also to irreversible pole coils 3. Contact brushes 4 act on the slip rings 1 and are connected to an electrical current source indicated diagrammatically by reference numeral 5. An interrupter and reversing switch 6 is provided which, in practice, has the purpose of reversing the polarity of the source which is supplied to the poles and, thereby, of effecting changeover of the poles.

For the case in which, in addition to reversible poles, disconnectible poles are also provided it is for example necessary to employ five slip rings 1, as illustrated in the diagram of FIG. 2. In particular, the fifth slip ring is connected to disconnectible poles 7, which in turn are connected between the irreversible poles and the conductor between the irreversible poles and one of the slip rings 1.

In this case, also, there is provided an interrupter and reversing switch 6, which has the purpose of reversing the polarity of the current supplied for the reversible poles and, simultaneously, excluding the irreversible poles.

As can be seen from the drawings of the prior art arrangements, considerable constructional difficulties arise which can be ascribed to the large number of slip rings and the associated contact brushes. Furthermore, the fact must be taken into account that in the case of five slip rings, each ring to which no electrical current is provided is subjected to considerable wear. Difficulties therefore arise with respect to its replacement and its maintenance.

It is accordingly an object of the present invention to avoid the above-mentioned disadvantages and to provide a circuit for changing the poles of a rotor of a synchronous machine which enables the possibility that reversing and, in some circumstances, disconnecting poles can be effected using only two slip rings.

It is a further object of the invention to substantially simplify the construction of the electrical machine and, for that purpose, to ensure that the two slip rings employed are always supplied with an electrical current, whereby wear of the rings is substantially reduced.

A further object of the invention is to provide a reversing circuit which, in particular, is widely usable and offers the possibility of affecting a large number of constructionally different poles, whereby a further simplification of the machine construction is possible.

An additional object of the present invention is to provide a circuit for changing the poles of a rotor of a synchronous machine which offers the greatest possible accessibility and functional security.

According to the present invention, there is provided a circuit for changing poles of the rotor of a synchronous machine, comprising first and second slip rings, contact brushes in operative connection with the first and second slip rings, means for reversibly connecting the contact brushes to an electrical current source, reversible pole coils operatively connected to one of the slip rings and connected through a first diode to a circuit portion which is formed by irreversible pole coils, and by a second diode and a third diode, and which is operatively connected with the other of the slip rings, and a circuit branch including a fourth diode having a polarity reversed with respect to the polarities of the first, second and third diodes, one terminal of the fourth diode being connected between the reversible pole coils and the first diode and the other terminal of the fourth diode being connected between the irreversible pore coils and the second diode.

The invention will be more readily understood from the following description of embodiments of the circuit according to the invention for changing the poles of the rotor of a synchronous machine.

With reference to FIG. 3 of the drawings, a circuit embodying the invention for changing over the poles of a rotor of a synchronous machine has a rotor circuit which is indicated generally by reference numeral 10 and which is operatively connected at its opposite ends to a first slip ring 11 and a second slip ring 12.

Brushes 13 act on the slip rings, which brushes are connected to connections 14 for the supply of electrical current, with an interrupter and reversing switch 15 connected therebetween. Upon alteration of the switch position, the polarity of the current being supplied is reversed.

The circuit of the rotor 10 includes the coils of reversible poles 20, these coils being connected in series. The poles 20 are connected by a conductor 21 to the first slip ring 11.

The reversible poles 20 are components of a circuit portion 22 which includes a first rotary diode 23.

The circuit portion 22 also includes coils 24 of irreversible poles, which coils are connected in series and are operatively connected in the circuit portion 22 with a second diode 25 and a third diode 26.

The circuit portion 22 is operatively connected, between the second diode 25 and the third diode 26, to the second slip ring 12 by a conductor 27.

A circuit branch 30 is also provided and includes a fourth diode 31 which has a polarity opposite from that of the previously-mentioned diodes.

The circuit branch 30 is connected at one end between the reversible poles 20 and the first diode 23, and its other end is connected between the irreversible poles 24 and the third diode 25.

As is schematically illustrated in FIG. 3, disconnectible pole coils 40 are provided. These can be connected in different ways to the circuit.

In FIG. 3, the disconnectible pole coils 40 are arranged in the circuit portion 22 between the circuit branch 30 and the diode 25.

Figure 4:
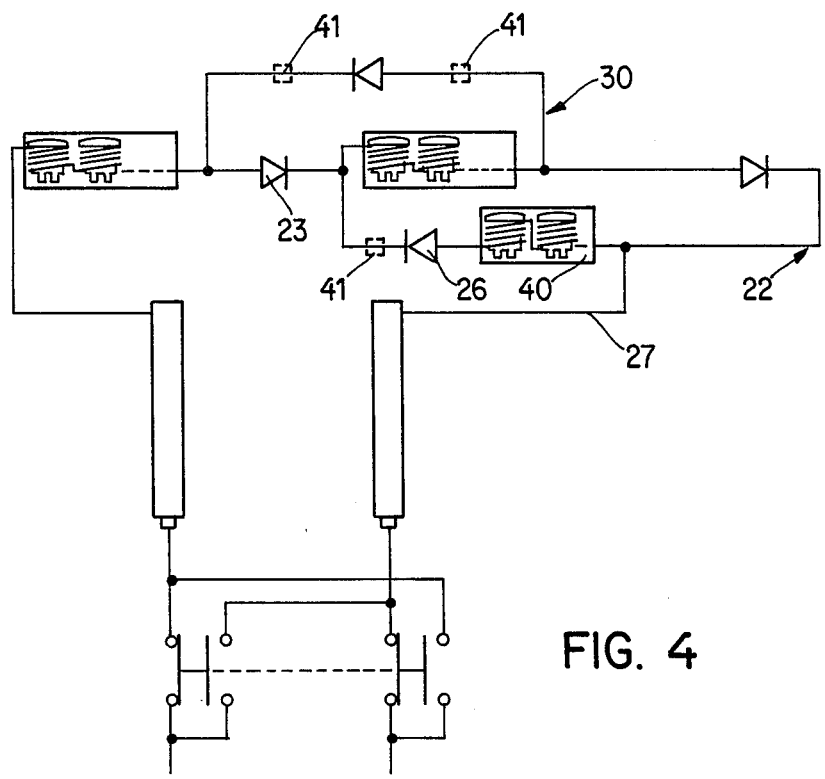
FIG. 4 shows an electrical circuit diagram of the changeover circuit according to the invention, with different connection and arrangement of the pole to be disconnected.

In FIG. 4, which shows a similar switching circuit, the disconnectible pole coils 40 are connected between the third diode 26 and the connection point of the circuit portion 22 to the electrical connecting conductor 27 of the slip ring 12.

It is possible to provide the disconnectible pole coils in other, different positions in the circuit of the rotor, as indicated by squares in broken lines which are indicated by reference numerals 41 and which, e.g., can be provided before or after the first diode 23, between the circuit portion 22 and the connection of the branch circuit 30, and between the second diode 25 and the conductor 27.

Likewise, the disconnectible pole coils, as is shown in FIG. 4, can be provided in the branch 30 both before and after the fourth diode 31 and in the circuit portion 22 between the third diode 26 and the point of connection of the first diode 23.

With the above-described circuits, it is possible to effect a reversal of the polarity of the current supplied to the reversible poles, whereby the electrical characteristics of the diodes are utilized. A reversal of the polarity of the supplied current, and a reversal of the reversible poles, is obtained with only two slip rings, which produces a substantial constructional simplification.

It can be added that it is possible to produce a circuit in which the diodes have polarities all of which are reversed with respect to the polarities shown in the drawings.

Furthermore, the diodes in the circuits illustrated may be replaced by components comprising series connections/parallel connections of diodes, in order to be able to adapt to the different current strengths and voltages.

The reversal of the polarity of the current supplied can, of course, be effected by other suitable electrical apparatuses, even when not including the provision of the interrupter and reversing switch.

In practical application, it occurs that, with the polarity of the supplied current illustrated in FIG. 3, this current flows in one direction through the reversible pole coils 20, through the first diode 23 to the circuit portion 22, through the irreversible pole coils 24 and the pole coils 40 which are in some circumstances to be disconnected, and then through the circuit into the second slip ring 12.

Upon reversal of the polarity of the supplied current, the current always flows in the same direction through the pole coils 24 (which are not reversible) and through the third diode 26, then through the branch 30 which is controlled by the fourth diode 31 and has a reversed polarity with respect to the previously mentioned polarities, and then in the reverse direction through the reversible pole coils 20, but does not flow through the disconnectible pole coils 40 since such current flow is prevented by the second diode 25.

A similar consideration holds true for the disconnectible pole coils which are shown in broken lines and indicated by reference numerals 41.

The manner in which the objects are fulfilled by the invention can be understood from the above description. The fact is emphasized, at this point, that the position of the rotatable diodes makes possible a substantial simplification, in a constructional respect, of the current flow path, with all advantages of a constructional and functional type.

The invention can, however, be constructionally modified without falling outside of the scope of protection. Also, individual parts can be replaced by other equivalent components.

The embodiment of the invention in which an exclusive property or privilege is claimed are defined as follows:

1. A circuit for changing poles of the rotor of a synchronous machine, comprising:
    first and second slip rings;
    contact brushes in operative connection with said first and second slip rings;
    means for reversibly connecting said contact brushes to an electrical current source;
    first pole coils operatively connected to one of said slip rings;
    a circuit portion operatively connected with the other of said slip rings and including second pole coils, and first and second diodes between said second pole coils and said other slip rings;
    a third diode between said first pole coils and said circuit portion, said first, second and third diodes all being arranged so as to permit the flow of current through said first and second pole coils in a direction towards said second slip ring; and
    a circuit branch having one terminal which is connected between said first pole coils and said third diode and another terminal which is connected between said second pole coils and said first diode, said circuit branch including a fourth diode arranged so as to permit the flow of current through said first pole coils in a direction towards said first slip ring but to inhibit the flow of current through said second pole coils in a direction towards said first slip ring.

2. A circuit as claimed in claim 1, wherein said third diode is connected to said circuit portion between said second pole coils and said second diode.

3. A circuit as claimed in claim 1, wherein said circuit portion is connected with said other slip ring between said first and second diodes.

4. A circuit as claimed in claim 1, wherein said circuit portion includes third pole coils between said first diode and said other terminal.

5. A circuit as claimed in claim 4, wherein said circuit portion is operatively connected with the circuit branch.

6. A circuit as claimed in claim 1, wherein third pole coils are arranged before and after said third diode between said circuit portion and said one terminal.

* * * * *